United States Patent
Huang et al.

(10) Patent No.: US 11,983,101 B2
(45) Date of Patent: May 14, 2024

(54) PROGRAM TESTING METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventors: Canhui Huang, Shenzhen (CN); Jinhui Sun, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 345 days.

(21) Appl. No.: 17/512,206

(22) Filed: Oct. 27, 2021

(65) Prior Publication Data

US 2022/0050769 A1 Feb. 17, 2022

Related U.S. Application Data

(63) Continuation of application No. PCT/CN2020/114504, filed on Sep. 10, 2020.

(30) Foreign Application Priority Data

Nov. 27, 2019 (CN) .......................... 201911180652.7

(51) Int. Cl.
G06F 11/00 (2006.01)
G06F 11/36 (2006.01)

(52) U.S. Cl.
CPC ...... G06F 11/3688 (2013.01); G06F 11/3644 (2013.01)

(58) Field of Classification Search
CPC .......................... G06F 11/3688; G06F 11/3644
(Continued)

(56) References Cited

U.S. PATENT DOCUMENTS 6,620,204 B1* 9/2003 Malcolm ............. G06F 11/3664
714/38.11
2006/0136579 A1* 6/2006 Linville .............. G06F 11/3688
709/208

(Continued)

FOREIGN PATENT DOCUMENTS

| CN | 102035857 | 4/2011 |
| CN | 105760308 | 7/2016 |

(Continued)

OTHER PUBLICATIONS

Supplementary European Search Report issued Jul. 12, 2022 in Application No. 20892256.7, pp. 1-12.

(Continued)

*Primary Examiner* — Sarai E Butler
(74) *Attorney, Agent, or Firm* — ARENTFOX SCHIFF LLP

(57) ABSTRACT

A program testing method is provided. The method includes receiving a test account adding instruction the test account adding instruction identifying a second test account, acquiring a first target code corresponding to a target program in response to the test account adding instruction, the first target code corresponding to a first page, a first test account being logged in on the first page, and the first page being generated according to the first target code, generating a second page corresponding to the second test account according to the first target code, and interacting through the first page and the second page to test the target program. Apparatus and computer-readable medium counterpart embodiments are also provided.

20 Claims, 8 Drawing Sheets

(58) Field of Classification Search
USPC .................................................. 714/1–57
See application file for complete search history.

(56) References Cited

U.S. PATENT DOCUMENTS

| | | | | |
|---|---|---|---|---|
| 2008/0184006 A1* | 7/2008 | Moon | ............... | G06F 8/4442 711/E12.004 |
| 2009/0037882 A1* | 2/2009 | Allen | ............... | G06F 11/3688 717/125 |
| 2009/0082008 A1* | 3/2009 | Thorell | ............... | G06F 11/362 455/423 |
| 2013/0247204 A1* | 9/2013 | Schrecker | ............... | H04L 45/306 726/25 |
| 2014/0132571 A1* | 5/2014 | Zeng | ............... | G06F 11/3688 345/178 |
| 2016/0162393 A1* | 6/2016 | Kalyanasundram | ............... | G06F 11/3684 714/33 |
| 2018/0247337 A1 | 8/2018 | Gourley et al. | | |
| 2019/0188116 A1* | 6/2019 | Roth | ............... | G06F 11/3608 |

FOREIGN PATENT DOCUMENTS

| | | |
|---|---|---|
| CN | 106775970 | 5/2017 |
| CN | 109344058 | 2/2019 |
| CN | 110928791 | 3/2020 |
| WO | 2019075973 | 4/2019 |

OTHER PUBLICATIONS

Jung Yungwoo et al: "VENUS: The Online Game Simulator Using Massively Virtual Clients" In: "Pattern Recognition : 5th Asian Conference, ACPR 2019, Auckland, New Zealand, Nov. 26-29, 2019, Revised Selected Papers, Part II", Jan. 1, 2005 (Jan. 1, 2005), Springer International Publishing, Cham, ISSN: 0302-9743 ISBN: 978-3-030-41298-2 vol. 3398, pp. 589-596, DOI: 10.1007/978-3-540-30585-9_66.

Chang-Sik Cho et al: "Scenario-Based Approach for Blackbox Load Testing of Online Game Servers", Cyber-Enabled Distributed Computing and Knowledge Discovery (CYBERC), 2010 International Conference on, IEEE, Piscataway, NJ, USA, Oct. 10, 2010, pp. 259-265, ISBN: 978-1-4244-8434-8.

Chang-Sik Cho et al: "Online game testing using scenario-based control of massive virtual users", Advanced Communication Technology (ICACT), 2010 The 12th International Conference on, IEEE, Piscataway, NJ, USA, Feb. 7, 2010, pp. 1676-1680, ISBN: 978-1-4244-5427-3.

Stahlke Samantha N Samantha Stahlke@Uoit CA et al: "Usertesting Without the User", Computers in Entertainment (CIE), ACMPUB27, New York, NY, USA, vol. 16, No. 2, Apr. 10, 2018, pp. 1-18, DOI: 10.1145/3183568.

International Search Report issued Dec. 14, 2020 in Application No. PCT/CN2020/114504. (5 pages).

Written Opinion issued Dec. 14, 2020 in Application No. PCT/CN2020/114504 (4 pages).

Chinese Office Action issued Apr. 1, 2021 in Application No. 2019111806527 with concise English translation. (13 pages).

W3Cschool, "WeChat's tool and the three main functional areas for program debugging," URL: https://www.w3cschool.cn/weixinapp/weixinapp-debug.html, Nov. 21, 2018 (16 pages).

Baidu Experience, "How to use Development Tools to Debug Multiple Accounts," URL: https://jingyan.baidu.com/article/14bd256ee081d2fb6c261261.html, Sep. 7, 2019 (2 pages).

* cited by examiner

PROGRAM TESTING METHOD AND APPARATUS, COMPUTER DEVICE, AND STORAGE MEDIUM

RELATED APPLICATIONS

This application is a continuation of International Application No. PCT/CN2020/114504, entitled "PROGRAM TESTING METHOD AND APPARATUS, COMPUTER DEVICE, AND STORAGE MEDIUM" and filed on Sep. 10, 2020, which claims priority to Chinese Patent Application No. 201911180652.7, entitled "PROGRAM TESTING METHOD AND APPARATUS, COMPUTER DEVICE, AND STORAGE MEDIUM," filed on Nov. 27, 2019. The entire disclosures of the above-identified prior applications are incorporated herein by reference in their entirety.

FIELD OF THE TECHNOLOGY

This application relates to the field of computer technologies, including a program testing method and apparatus, a computer device, and a storage medium.

BACKGROUND OF THE DISCLOSURE

With the development of computer technologies, functions of various applications (APPs) are constantly enriched. It is increasingly common to acquire information through applications for study or work. For example, a video can be downloaded from a corresponding video server through a video playback program and played back in a terminal.

At present, in order that an application can provide better services, it is necessary to test the application and find a problem in the application to modify the application. At present, an application is usually tested online after the application is launched, resulting in failure to discover the problem of the application in time, and the program testing efficiency is low.

SUMMARY

A program testing method and apparatus, a computer device, and a storage medium are provided according to various embodiments provided in this disclosure.

A program testing method executed by a computer device is provided, the method including: (1) receiving a test account adding instruction, the test account adding instruction carrying a second test account; (2) acquiring a first target code corresponding to a target program in response to receiving the test account adding instruction, the first target code corresponding to a first page, a first test account being logged in on the first page, and the first page being generated according to the first target code; (3) generating a second page corresponding to the second test account according to the acquired first target code; and (4) interacting through the first page and the second page to test the target program.

A program testing apparatus is provided, the apparatus including processing circuitry configured to (1) receive a test account adding instruction, the test account adding instruction identifying a second test account; (2) acquire a first target code corresponding to a target program in response to the test account adding instruction, the first target code corresponding to a first page, a first test account being logged in on the first page, and the first page being generated according to the first target code; (3) generate a second page corresponding to the second test account according to the acquired first target code; and (4) interact through the first page and the second page to test the target program.

In some embodiments, the processing circuitry is further configured to (1) receive a code selection operation in a test program, and use a code selected by the code selection operation as the target code, the first test account being logged in the test program; and (2) generate the first page corresponding to the first test account according to the target code.

In some embodiments, the processing circuitry is further configured to (1) receive an adjustment instruction for adjusting the first target code, the adjustment instruction including code adjustment information; and (2) obtain an adjusted second target code according to the code adjustment information, and update the first page and the second page according to the second target code.

In some embodiments, the processing circuitry is further configured to (1) load the second target code in a shared running space; (2) execute, by a first process, the second target code in the shared running space to update the first page; and (3) execute, by a second process, the second target code in the shared running space to update the second page.

In some embodiments, the processing circuitry is further configured to (1) acquire a first running space of the first process, the first running space being used for loading a runtime environment corresponding to the first process; and (2) create the second process, using the first running space as the shared running space for loading the runtime environment, and generate the second page corresponding to the second test account by using the second process according to the first target code.

In some embodiments, the processing circuitry is further configured to (1) display the first target code on a test program page corresponding to the first test account; and (2) receive an adjustment operation on the first target code, obtain the second target code according to the adjustment operation, and trigger the adjustment instruction for adjusting the first target code.

In some embodiments, the processing circuitry is further configured to (1) receive a code debugging instruction, the code debugging instruction being received through a first code debugging page or a second code debugging page, the first code debugging page being a code debugging page on which the first test account is logged in, and the second code debugging page being a code debugging page on which the second test account is logged in; and (2) debug the target code according to the code debugging instruction to obtain a result of the debugging.

In some embodiments, the processing circuitry is further configured to perform at least one of the following steps: (1) receiving an inputted first operation through the first page, and displaying, on the second page, a result of the operation obtained according to the first operation; and (2) receiving an inputted second operation through the second page, and displaying, on the first page, a result of the operation obtained according to the second operation.

In some embodiments, the processing circuitry is further configured to (1) display an account adding page, at least one candidate account being displayed on the account adding page; and (2) use, according to an account selection operation received through the account adding page, a candidate account selected by the account selection operation as the second test account, and trigger the test account adding instruction.

In some embodiments, the processing circuitry is further configured to acquire at least one preset virtual account, and generate the account adding page by using the at least one preset virtual account as the at least one candidate account.

In some embodiments, the processing circuitry is further configured to (1) display an account adding page, a corresponding account login code being displayed on the account adding page, so that a second terminal scans the account login code and transmits a login authorization instruction to a corresponding server, the login authorization instruction identifying a user account corresponding to the second terminal; and (2) receive the user account corresponding to the second terminal sent by the server according to the login authorization instruction, and display the user account as the candidate account on the account adding page.

A computer device including a memory and processing circuitry is provided, the memory stores computer-readable instructions, and the computer-readable instructions, when executed by the processing circuitry, cause the processing circuitry to perform the operations of the above program testing method.

One or more non-volatile storage media storing computer-readable instructions are provided, and the computer-readable instructions, when executed by processing circuitry, cause the processing circuitry to perform the operations of the above program testing method.

The details of one or more embodiments of this disclosure are set forth in the following drawings and description. Other features, objectives, and advantages of this disclosure become apparent from the specification, the accompanying drawings, and the claims.

BRIEF DESCRIPTION OF THE DRAWINGS

In order to explain the technical solutions in the embodiments of this disclosure more clearly, accompanying drawings needed in the description of the embodiments will be introduced in brief below. The accompanying drawings in the following description are only some embodiments of this disclosure. For those of ordinary skill in the art, other accompanying drawings can be obtained based on these accompanying drawings.

DESCRIPTION OF EMBODIMENTS

In order to make the objectives, technical solutions, and advantages of this disclosure clearer, this disclosure is further described in detail below with reference to the accompanying drawings and embodiments. It is understandable that the specific embodiments described here are only used to explain this application, and are not intended to limit this disclosure.

It is understandable that terms such as "first" and "second" used in this disclosure can be used herein to describe various elements, but unless otherwise specified, these elements are not limited by these terms. The terms are merely used for distinguishing a first element from another element. For example, without departing from the scope of this disclosure, a first page may be referred to as a second page, and similarly, the second page may be referred to as the first page.

Figure 1:
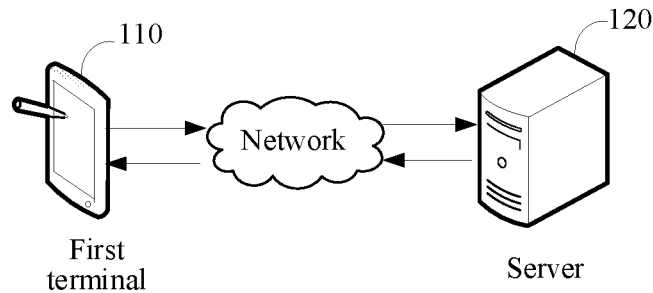
FIG. 1 is an application environment diagram of a program testing method according to some embodiments.

FIG. 1 is an application environment diagram of a program testing method according to some embodiments. As shown in FIG. 1, the application environment includes a first terminal 110 and a server 120. A developer tool may be run on the first terminal 110, and the program testing method provided in this embodiment may be implemented in the developer tool. For example, in the developer tool, a first test account has been logged in, and a program interface, referred to as a first page, of a child application is generated according to the child application written by a user. When the user intends to determine whether there is a problem with an interactive function of the child application, since implementation of the interactive function requires interaction of at least two accounts, a test account adding instruction may be triggered through an account adding operation, and the test account adding instruction carries a second test account. The developer tool, in response to the test account adding instruction, uses the child application as a target program to acquire code corresponding to the target program. The developer tool generates a page corresponding to the second test account according to the code of the target program, and the page is referred to as a second page. In this way, interaction can be performed through the first page and the second page, and the target program can be tested. When a program developer finds that there is a problem with the program during the interaction, for example, when finding that the program responds slowly or a running logic corresponding to a certain function is chaotic, the developer can debug the application in the developer tool. If a problem is found, the code of the target program may be modified in the developer tool. The interaction between the first page and the second page may be performed through the server 120.

The interaction process is determined according to the target program. For example, assuming that the child application is a game application, such as a Multiplayer Online Battle Arena (MOBA) game application, a terminal displays a first game interface (the first page) with the first test account and a second game interface (the second page). The first test account and the second test account are accounts corresponding to both sides of a battle. A program tester can move a game object (such as a hero) controlled by the first test account to a position A on the first game interface. It is also displayed on the second game interface that the game object is moved to the position A. At this point, the program tester may perform a skill application operation corresponding to a skill B on the second game interface. The first terminal applies the skill B to the hero according to the skill application operation, and the skill B will reduce a life value of the hero A. Then, an application process of the skill B may be displayed on the first game interface, and it is displayed that the life value of the hero A is reduced. It is understandable that the application process of the skill B may also be displayed on the second game interface, and it is displayed that the life value of the hero A is reduced.

The server 120 may be an independent physical server, or a server cluster composed of a plurality of physical servers, and may be a cloud server that provides basic cloud computing services such as cloud servers, cloud databases, cloud storage, and CDN. The first terminal 110 may be, is not limited to, a smart phone, a tablet computer, a notebook computer, a desktop computer, or the like. The first terminal 110 and the server 120 may be connected through a communication connection method such as a network, which is not limited in this disclosure.

Figure 2:
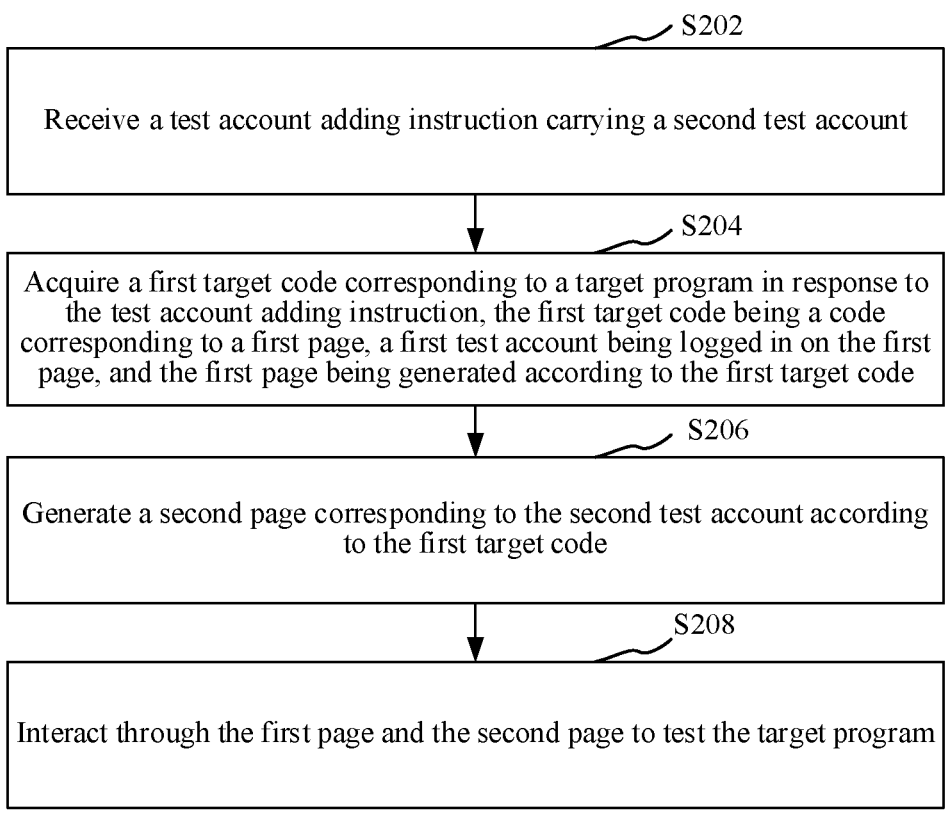
FIG. 2 is a flowchart of a program testing method according to some embodiments.

As shown in FIG. 2, in some embodiments, a program testing method is proposed, and this embodiment mainly uses the method applied to the first terminal 110 in FIG. 1 as an example for illustration. The method may specifically include the following steps:

In Step S202, a test account adding instruction is received, the test account adding instruction identifies a second test account.

Specifically, the test account adding instruction is used for instructing to add a test account, and may be triggered by the first terminal in response to a test account adding operation. There may be one or a plurality of second test accounts. "A plurality of" refers to at least two. The second test account may be a user account that has been registered in advance. The second test account may include at least one of a real user account or a virtual user account. The real user account refers to an account obtained by the user through account registration. The virtual user account is not a real user account, but a virtual one. For example, it is used specifically for a test program to omit a user account registration process. For example, the real user test account may be an instant messaging account, and the user can log in to the instant messaging application through the account to perform instant messaging. The virtual user account cannot log in to the instant messaging application for communication.

In some embodiments, the terminal may run a test program for testing codes. The test program may receive a test account adding instruction. The test program may be, for example, a developer tool or any program that can be used for locally simulating a running condition of the target program. The developer tool is also referred to as an Integrated Development Environment (IDE), and is a type of application software that assists in the development of computer programs. For example, the developer tool may be a child application developer tool, which may be used for development and debugging of a child application.

The child application is commonly known as an applet, which is an application that can be implemented in an environment provided by a parent application. The parent application program is an application program including the child application program and provides an environment for implementation of the child application program. The parent application program is a native application program. The native application is an application that can run directly on an operating system. For example, the parent application may be an instant messaging application, and the child application may be a file management application, a mail application, a game application, or the like. After the child application is released, an icon of the child application may be displayed on a page corresponding to the parent application. When the user clicks/taps on the icon, the child application can be run in the environment provided by the parent application. For example, the game application is run, and therefore, the user can enter the game without installing the game application in the terminal in advance.

In some embodiments, the test program may display an account adding page, a test account to be added may be determined through the account adding page to serve as a second test account, and the test account adding instruction is triggered.

In Step S204, a first target code corresponding to the target program is acquired in response to receiving the test account adding instruction, the first target code corresponding to the first page, a first test account being logged in on the first page, and the first page being generated based on the first target code.

Specifically, the program (Application) is embodied through codes, and a designed function can be performed by running the codes. In some developer tools, a program may be referred to as a project. Codes may be imported in the developer tool, or the codes may be edited in the developer tool, and a page corresponding to the codes is generated according to the codes through a simulator. The page is used to display content, and the content may include at least one of a picture, a text, a control, or a video. For example, the child application developer tool includes a child application simulator. The child application simulator is configured to simulate the real logic performance of the currently developing child application in a parent application. Most interfaces can present correct states on the child application simulator. The child application simulator is configured to simulate a state of the child application when the child application is running normally in the parent application.

The first target code is the code of the target program, and the first page is generated according to the first target code. A running environment of the program may be simulated by the simulator, and the first target code may be loaded to generate the first page.

In some embodiments, before the first terminal receives the test account adding instruction, the program testing method further includes: in the test program, receiving a code selection operation, using the code selected by the code selection operation as the target code, where the first test account is logged in the test program; and generating the first page corresponding to the first test account according to the target code.

Specifically, the code selection operation may be an operation of importing a code of a program. For example, when a developer tool is opened for the first time, an edited code can be imported. The developer tool in the first terminal may also receive a code editing operation to obtain a corresponding target code, receive a selection operation of a program name corresponding to the target code, and use the code of the program corresponding to the selection operation as the target code.

The first test account may be logged in beforehand. For example, when a click/tap operation on an icon of the developer tool is received, a login page is opened. When a user account and a password entered by the user on the login page are received, a developer application can be logged in. Codes may be imported or edited in the developer tool. After the code of the program to be tested is obtained, the developer tool loads the code by using the simulator to generate the first page. When a test account needs to be added based on the first test account, the test account adding instruction may be triggered by an operation.

In some embodiments, the first page may be displayed in the form of a window. The "window" is an area that is displayed on a screen and corresponds to an application. A window is displayed on the screen, indicating that the application corresponding to the window is running. A corresponding window may also exist after the test program is opened, and therefore, the first page may be an independent window, or may be embedded as a sub-window in the corresponding window of the test program. For example, for the child application developer tool, after the child application developer tool is opened, a first child application debugging window is displayed for debugging the child application, and the first page is embedded in the first child application debugging window.

In Step S206, a second page corresponding to the second test account is generated according to the first target code.

Specifically, after obtaining the first target code, the first terminal generates a second page corresponding to the second test account according to the first target code, and the second test account is logged in on the second page. In the process of generating the page, the first terminal may also interact with a corresponding server for login. For example, if the second test account is a virtual user account, the first terminal may transmit an account login request to the server. The first page and the second page are both generated according to the first target code, and therefore, the content displayed on the pages may be consistent. For example, when the target program is an applet, both the first page and the second page may be client pages of the applet, but login accounts are different, so that an operation may be performed on the client page to implement the interactive function provided by the applet.

In some embodiments, the second page may be displayed in the form of a window. A corresponding window may also exist after the test program is opened, and therefore, the second page may also be an independent window, or may be embedded as a sub-window in the window corresponding to the test program. For example, for the child application developer tool, the first terminal may generate a second child application debugging window while generating the second page, and at the same time, the second page is embedded in the second child application debugging window. The first child application debugging window and the second child application debugging window are used for debugging the same child application.

In some embodiments, the first page is in the first child application debugging window, and the second page is in the second child application debugging window. When the first child application debugging window is generated, the first terminal may acquire information such as an application identification (appid for short) of the target program, a code storage path, and a name of the program, as well as developer information (for example, a first test account of the developer). Therefore, the code storage path may be determined according to the application identification, and the corresponding code may be acquired according to the code storage path to generate the first page. Moreover, the name of the target program is displayed on the first page, and the name of the first test account is displayed in the first child application debugging window. When the second child application debugging window is generated, the program name of the target program may also be displayed on the second page, and a name of the second test account is displayed in the second child application debugging window, thus improving the recognizability of the window.

In some embodiments, the first child application debugging window and the second child application debugging window share a runtime environment of the target code, so that when the target code is modified, the first page in the first child application debugging window and the second page in the second child application debugging window may be changed simultaneously.

In some embodiments, the first terminal may use the first test account as a main account. The first child application debugging window is used as a main window, and the second child application debugging window is used as a sub-window. Functions of the main window and the sub-window may have similarities and differences. For example, there are simulators and debuggers for both the sub-window and the main window. The debugger is used for debugging the code, and the debugging may be performed in the main window or in the sub-window. In addition, the main window may also display the target code and correspondingly have a code editor, which can edit the code.

Figure 3A:
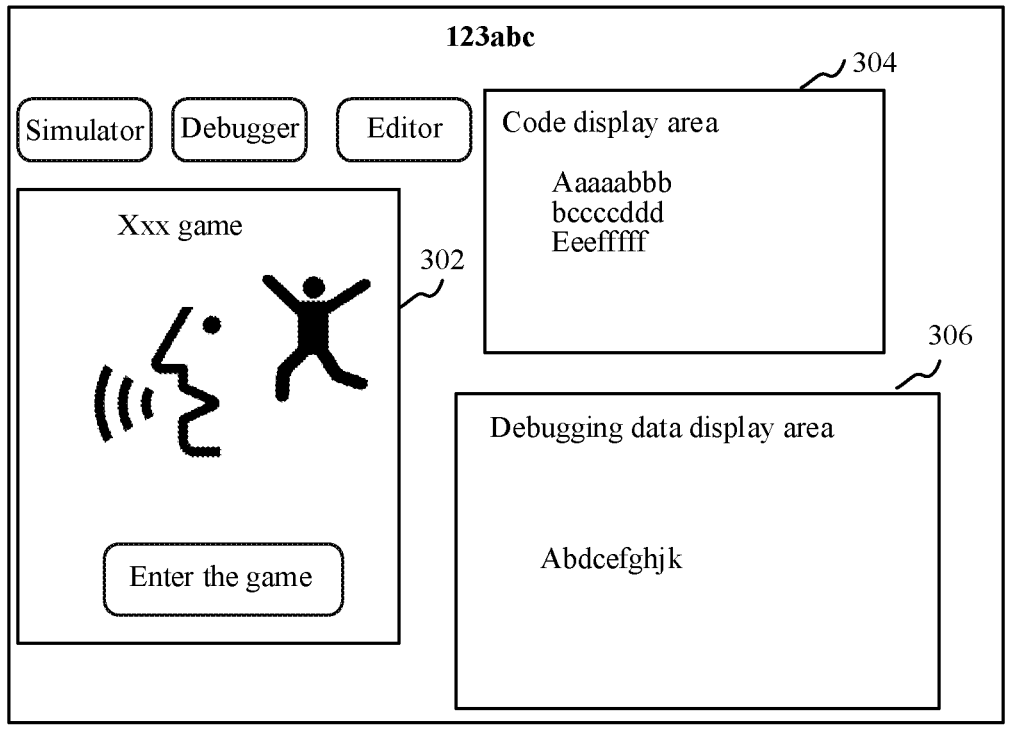
FIG. 3A is a schematic diagram of a screen interface before a test account adding instruction is received according to some embodiments.

FIG. 3A shows a screen interface diagram before the test account adding instruction is received according to some embodiments. As can be seen from FIG. 3A, the first child application debugging window corresponding to the first page is correspondingly provided with controls for a trigger simulator, a debugger, and an editor. A page display area 302, a code display area 304 for displaying the code of the program to be tested, and a debugging data display area 306 are further included. The debugging data display area 306 may display a log of the executed code, for example. The first page may be displayed on the page display area 302. "123abc" on the first child application debugging window is the name corresponding to the first test account, such as a user name in an instant messaging account. "Xxx game" is the name of the target program. A button of "Enter game" is displayed on the first page, and when the button is clicked/tapped, the game is entered.

Figure 3B:
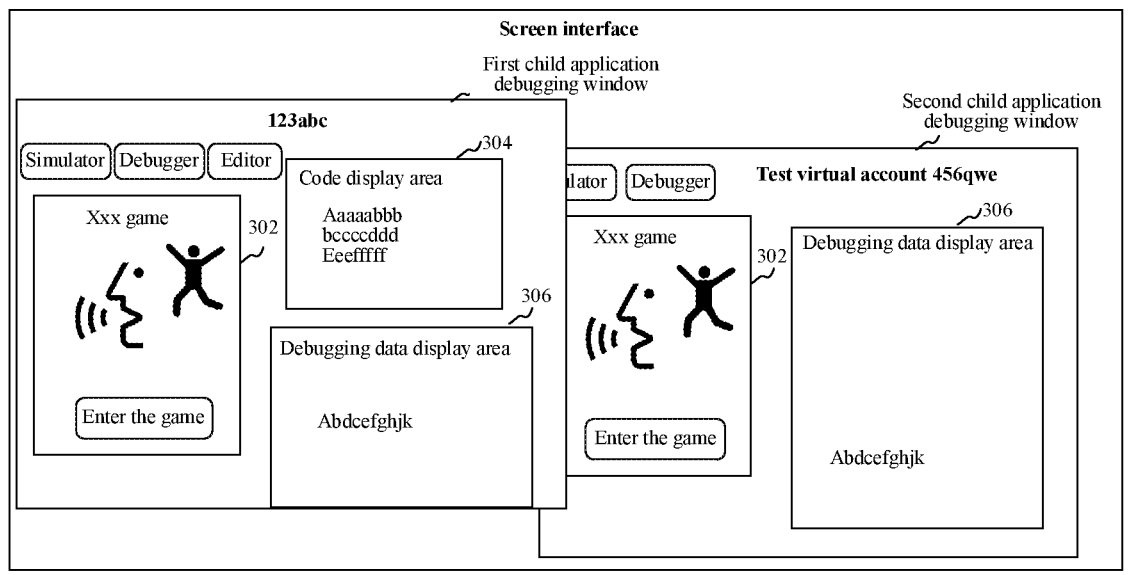
FIG. 3B is a schematic diagram of a screen interface after a second page is generated according to some embodiments.

FIG. 3B is a screen interface diagram after the test account adding instruction is received and the second page is generated according to some embodiments. The first child application debugging window and the second child application debugging window are displayed on the screen. The second child application debugging window is correspondingly provided with controls for invoking the simulator and the debugger, and further includes the page display area 302 and the debugging data display area 306. The second page is displayed on the page display area 302, and the second page is embedded in the second child application debugging window. "456qwe" on the second child application debugging window is the name corresponding to the second test account, such as a user name in an instant messaging account. Before the name corresponding to the second test account, prompt information "test virtual account" indicating that the account is a test number is further included to indicate that the second test account is an added virtual account. "Xxx game" is the name of the target program. A button of "Enter game" is also displayed on the second page, and when the button is clicked/tapped, the game is entered.

In Step S208, the first page and the second page are interacted with to test the target program.

Specifically, the test account is logged in on both the first page and the second page, and therefore, interaction can be performed through the server, and when the interaction is performed through the first page and the second page, operations may be received through the first page and the second page. For example, when the second test account is successfully added, the server stores a binding relationship between the first test account and the second test account, so a message can be transferred through the server. For another example, when the second test account is successfully added, the first terminal may store the binding relationship between the first test account and the second test account, the bound test accounts are carried during the interaction, and the server determines another page that requires interaction according to the carried bound test accounts.

The method for interaction between the first page and the second page is determined according to the type of the target program and the design of the program. For example, assuming that the target program is a social program, an instant message entered by the user may be received on the first page, and the terminal transmits the instant message to the server. After receiving the instant message, the server may forward the instant message to the page corresponding to the first test account. For another example, assuming that the target program is a game program, if the terminal receives a game operation triggered on the page corresponding to the first test account, a type of the operation may be sent to the server. The server determines a result of the operation according to the type of operation, and transmits the result of the operation to the first page and the second page.

In some embodiments, the operation on at least one of the first page and the second page may be performed by the user. For example, a tester performs the operation to perform manual testing, and the tester observes whether there is a problem during the program interaction. The operations on at least one of the first page and the second page may be performed automatically. For example, a corresponding artificial intelligence model may be trained, and the artificial intelligence model may perform game battle in a game. The operation on the first page is inputted by the user, and the operation on the second page is outputted by the artificial intelligence model.

In the above program testing method, the second page may be generated according to the code corresponding to the first page through the test account adding instruction, and the test accounts corresponding to the first page and the second page are different. Therefore, interaction may be performed through the first page and the second page to test the target program, thus improving the efficiency of program testing.

In some embodiments, interacting through the first page and the second page includes at least one of the following steps: receiving an inputted first operation through the first page, and displaying, on the second page, a result of the operation obtained according to the first operation; or, receiving an inputted second operation through the second page, and displaying, on the first page, a result of the operation obtained according to the second operation.

Specifically, the user may operate on the first page or on the second page. The type of the operation and the result of the operation are determined according to the needs and the design of the target program. For example, the type of the operation may be an operation of inputting an instant message, and the result of the operation is obtaining the instant message. If the first page receives the operation of transmitting an instant message, the server may forward the instant message to the second page on which the second test account is logged in, and the second page displays the instant message. The type of the operation may also be an operation of applying a game skill, and the result of the operation is the effect of applying the skill displayed on the game screen. It is understandable that the result of the operation obtained according to the first operation may also be displayed on the first page, and the result of the operation obtained according to the second operation may also be displayed on the second page.

Figure 4:
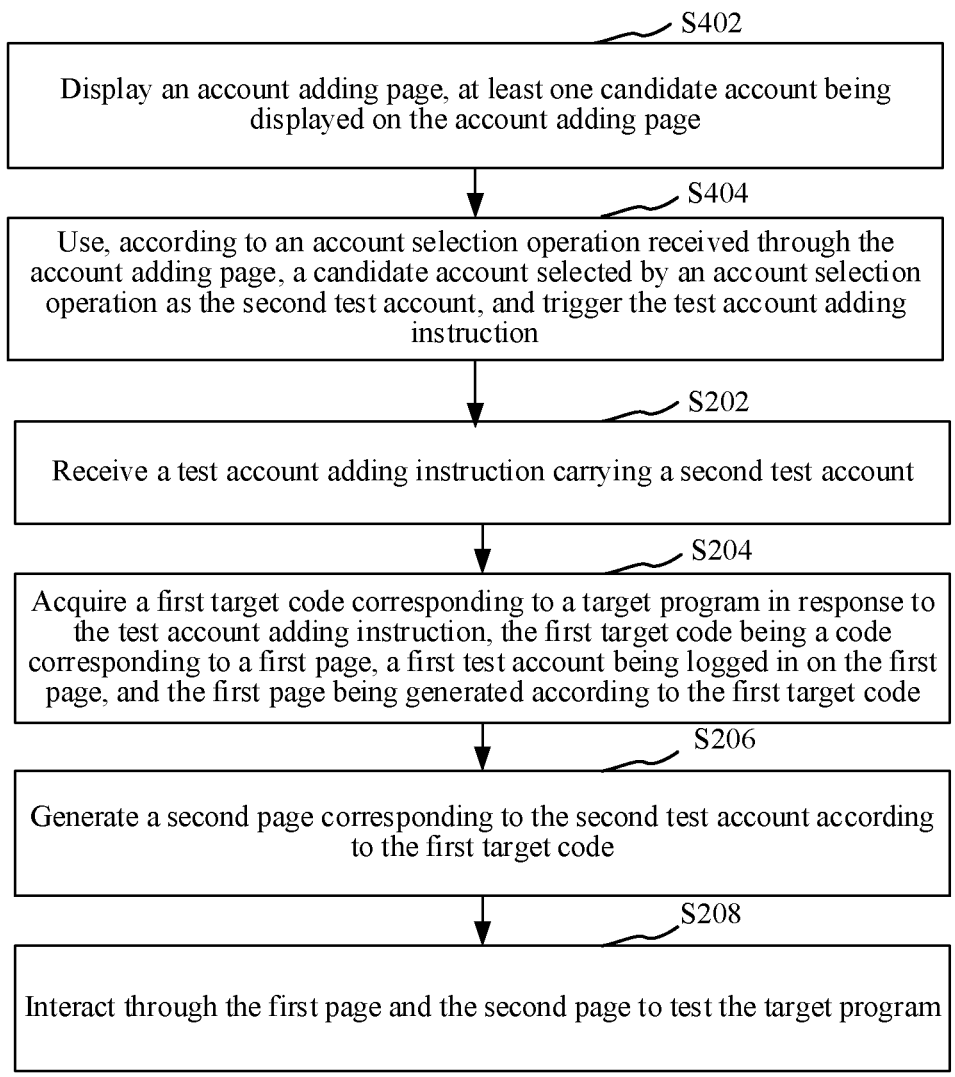
FIG. 4 is a flowchart of a program testing method according to some embodiments.

In some embodiments, as shown in FIG. 4, the program testing method may also include the following steps.

In Step S402, an account adding page is displayed, at least one candidate account being displayed on the account adding page.

Specifically, the candidate account may include at least one of a virtual account and a real account. The virtual account may be written into the code of the test program, or may be issued by a backend server corresponding to the test program. Therefore, the corresponding backend server may also be logged in through a virtual account. For the real account, a login interface may be displayed on the test program. When a user account and a password entered by the user are acquired through the login interface, the user account and the password may be sent to the backend server corresponding to the test program, and when verification performed by the backend server is successful, the terminal may use the user account as the candidate account and label a login status of the account.

The account adding page may be displayed automatically or triggered by the user. For example, in an interface of the developer tool, an area for adding an account may be set. For another example, the developer tool may display an account adding page entry, such as a button. The account adding page may be displayed according to an operation of triggering the account adding page entry.

In some embodiments, the first terminal may acquire at least one preset virtual account, and generate the account adding page by using the at least one preset virtual account as the at least one candidate account.

Specifically, there may be one or a plurality of preset virtual accounts, which are set in advance. The virtual account may be preset in the server and sent to the test program in advance, and the test program saves the preset virtual account. The virtual account may also be written into the code of the test program in advance. By using the at least one preset virtual account as the at least one candidate account, the user can directly select the virtual account as a test account to be added, thus reducing the number of account addition steps.

In some embodiments, the account adding page may be displayed, and a corresponding account login code is displayed on the account adding page, so that the second terminal scans the account login code and transmits a login authorization instruction to the corresponding server. The login authorization instruction carries a user account corresponding to the second terminal. The user account corresponding to the second terminal sent by the server according to the login authorization instruction is received, and displayed as a candidate account on the account adding page.

Specifically, the account login code is used for account login, and may be generated according to an account login request, or may be automatically displayed on an account adding interface. The second terminal is a terminal different from the first terminal. The server may determine a unique identification of the login request according to the account login request, and generate a QR code corresponding to the unique identification to serve as the account login code. The unique identification is used to identify the login request, and may be generated according to the first test account and the current time, for example. The account login code can be used one or more times. For example, if two candidate accounts need to be added, two second terminals may be used to scan the QR code for login respectively.

The login authorization instruction is used for indicating that the user account is allowed to log in at the first terminal. The login authorization instruction may also carry a unique identification corresponding to the account login code. Therefore, the server can confirm, according to the unique identification, the first terminal authorized by the login authorization instruction, transmit the user account corresponding to the second terminal to the first terminal, and display the user account corresponding to the second terminal on the account adding page.

In this embodiment, the user account logged in at the second terminal may be an instant messaging account. For example, the developer tool may be logged in through an instant messaging account. Logging in is performed by scanning the account login code using the second terminal, and it is not necessary to enter a test account on the developer tool, which is simple and convenient, and can improve the security of the account.

In Step S404, according to an account selection operation received through the account adding page, a candidate account selected by the account selection operation is used as the second test account, and the test account adding instruction is triggered.

Specifically, a test account to be added may be selected through the account adding page. The test account selection operation may be at least one of a voice operation, a gesture operation, or a touch operation. The touch operation may be an operation of tapping or sliding on the terminal screen. For example, a page for adding a user account may be displayed on the test program. A plurality of user accounts are displayed on the page. When the user clicks/taps on one of the user accounts, the first terminal may use the user account as the second test account and trigger the test account adding instruction.

The test account adding instruction may be triggered by one operation or by a plurality of operations. For example, the account adding page displays selection boxes corresponding to user accounts. When a click/tap operation on a selection box is received, the corresponding user account is used as the second test account, where the selection box may be a check box, so that click/tap operations on a plurality of check boxes may be received to select a plurality of user accounts as the second test accounts. When the account selection is completed and an operation of confirming the completion of the account selection is received, the test account adding instruction is triggered.

Figure 5:
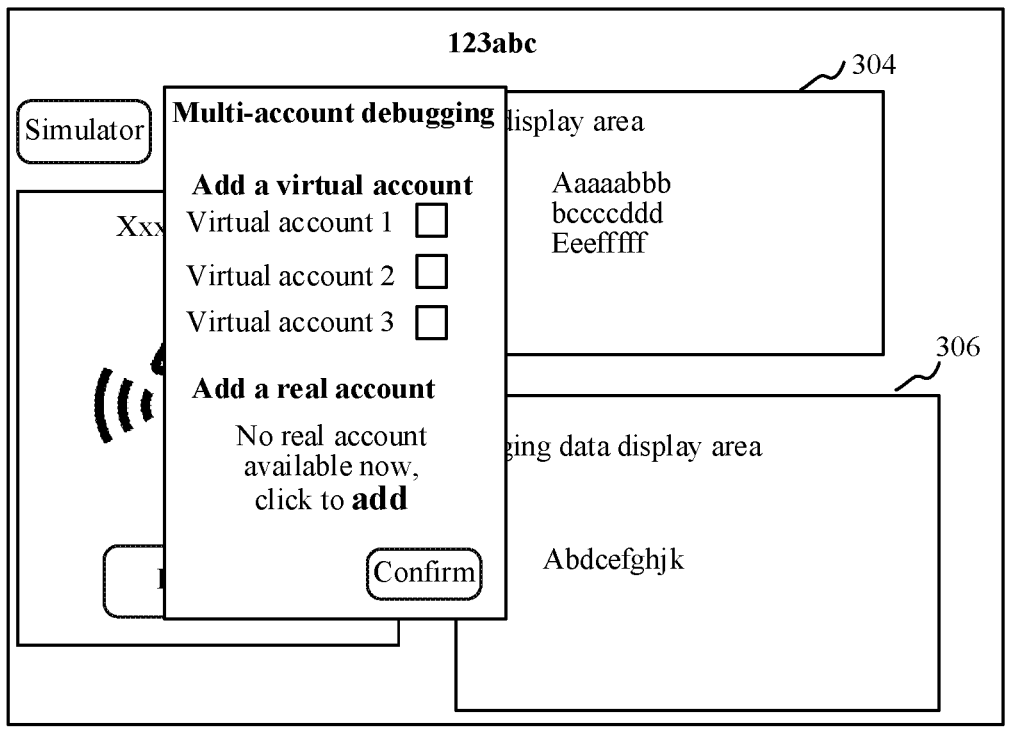
FIG. 5 is a schematic diagram of an account adding page according to some embodiments.
Figure 6:
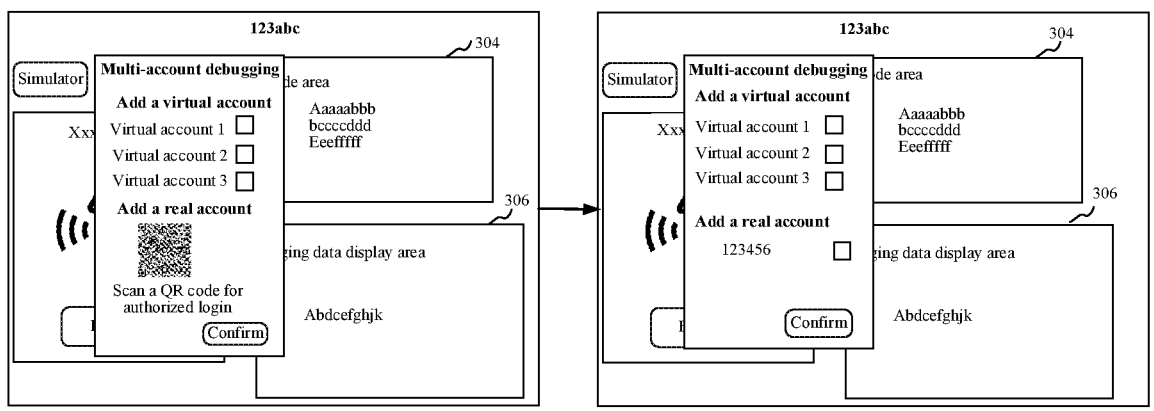
FIG. 6 is a schematic diagram of an account adding page according to some embodiments.

FIG. 5 is a schematic diagram of the account adding page according to some embodiments. A control that triggers the display of the account adding page may be displayed on the developer tool, and when the user clicks/taps on the control, the account adding page is displayed on the developer tool. There are 3 virtual accounts displayed on the account adding page: virtual account 1, virtual account 2, and virtual account 3. Selection boxes corresponding to the virtual accounts and a functional control "Add" that requests the addition of a real account are further displayed. The user may select a virtual account as the account to be added. The "Add" control may also be clicked/tapped to trigger a login request. When the login request is triggered, as shown in the left drawing of FIG. 6, a QR code and a prompt message "Scan QR code to authorize login" are displayed on the account adding page. The user may scan the QR code by using the scanning function of the program in the second terminal, an instant messaging account being logged in the program, and the instant messaging program in the second terminal may display a prompt message about whether to authorize the login. After the operation of confirming the authorized login is received, a login authorization instruction is triggered. Therefore, as shown in the right diagram of FIG. 6, assuming that a user account "123456" is logged in at the second terminal, the user account "123456" and a corresponding selection box are displayed on the account adding page. After the user has made the selection, a "Confirm" control may be clicked/tapped to trigger the test account adding instruction.

Figure 7:
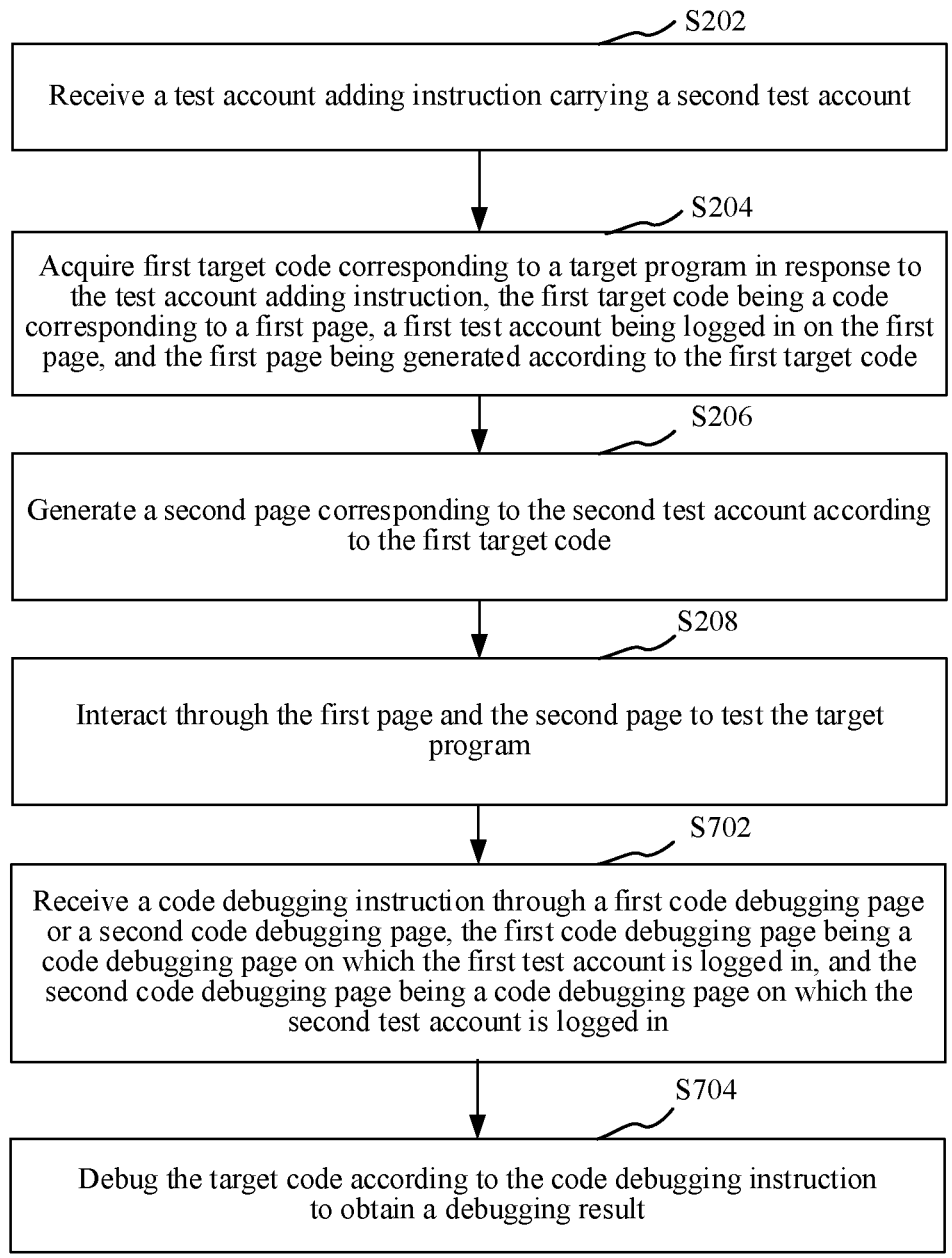
FIG. 7 is a flowchart of a program testing method according to some embodiments.

In some embodiments, as shown in FIG. 7, the program testing method may further include the following steps.

In Step S702, a code debugging instruction is received, the code debugging instruction being received through a first code debugging page or a second code debugging page, the first code debugging page being a code debugging page on which the first test account is logged in, and the second code debugging page being a code debugging page on which the second test account is logged in.

Specifically, in the process of interacting through the first page and the second page, it may be found that there is a problem with the target program. For example, a response result is inconsistent with an output result expected by the user. It may be necessary to debug the code to find out the problem in the code. The code debugging instruction may be performed through a code debugging operation. For example, the first terminal may receive a click/tap operation on a "debugger" button in the developer tool, and trigger the display of a debugging panel for receiving a debugging operation. The user may enter a debugging parameter such as an identification of a function to be debugged in the debugging panel, and trigger the debugging instruction through a corresponding operation.

In Step S704, code debugging is performed according to the code debugging instruction to obtain a result of the debugging.

Specifically, after the code debugging instruction is obtained, code debugging may be performed according to the debugging parameter. For example, the function to be debugged may be called to execute the function. During debugging, the first terminal may also output user log information generated during the execution of the code. The user log information may play an auxiliary role in the debugging of the program as it contains a certain amount of information. The result of the debugging may vary according to different codes, for example, it may include at least one of a function execution time and function call information. The function execution time is the time consumed for the code to be executed once. The function call information is used for describing information of another function called when the function is executed, so that the debugger may determine the problem of the code according to the call information.

The first code debugging page may be the first child application debugging window in FIG. 3B, and the second code debugging page may be the second child application debugging window in FIG. 3B. Code debugging may be performed in the first child application debugging window, or may be performed in the second child application debugging window.

In this embodiment, by debugging the code, the problem in the code may be found, and the problematic code may be modified to improve the running efficiency of the modified target program. Moreover, the debugging of the program is a part of the entire development process, and therefore, while improving the debugging efficiency, the development efficiency is also improved accordingly.

Figure 8:
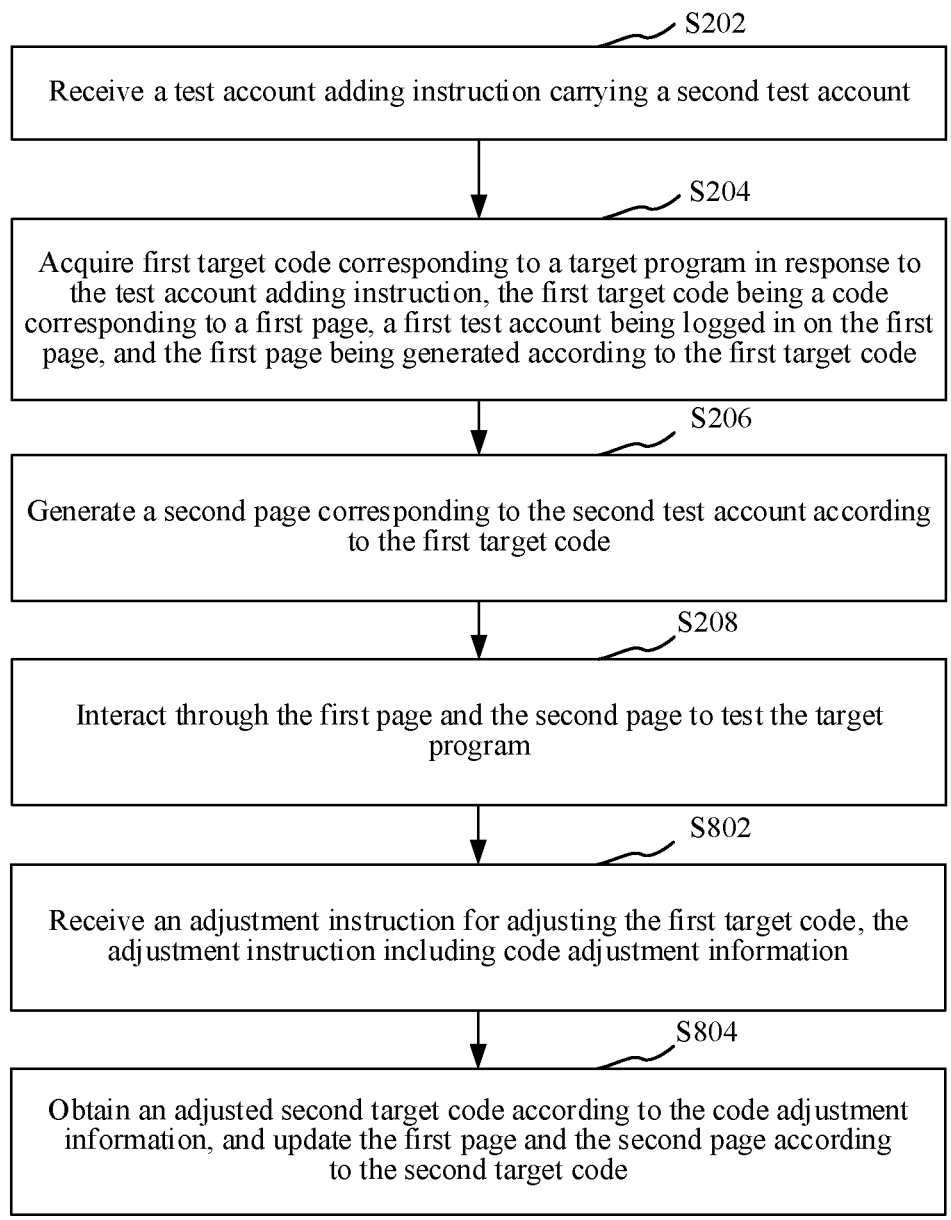
FIG. 8 is a flowchart of a program testing method according to some embodiments.

In some embodiments, as shown in FIG. 8, the program testing method also includes the following steps.

In Step S802, an adjustment instruction for adjusting the first target code is received, the adjustment instruction including code adjustment information.

Specifically, the adjustment instruction is used for instructing to adjust the code. The code adjustment information may include a code operation type and a corresponding code. The code adjustment information may also be the adjusted target code itself. The code operation type may be at least one of deletion, insertion, and update.

When the code needs to be modified, for example, when a problem is found in the code during the debugging, the adjustment instruction may be triggered through the code adjustment operation. For example, the first target code may be displayed on a code display area of the test program, and the code may be edited in the code display area to obtain the adjusted target code.

In some embodiments, the program testing method may further include the following steps: (1) displaying the first target code on the test program page corresponding to the first test account; and (2) receiving an adjustment operation on the first target code, obtaining a second target code according to the adjustment operation, and triggering an adjustment instruction for adjusting the first target code.

Specifically, the test program page is a page displayed by a test program client, for example, it may be the first child application debugging window on the developer tool. The adjustment operation may be at least one of a deletion operation, a replacement operation, or an insertion operation. The second target code is a code obtained after the first target code is adjusted. By displaying the first code on the test program page corresponding to the first test account, the user may directly modify the code on the test page, thus improving the efficiency of the test.

In Step S804, the adjusted second target code is obtained according to the code adjustment information, and the first page and the second page are updated according to the second target code.

Specifically, when the code adjustment information indicates that the deletion operation type is included, the code that needs to be deleted may be deleted. When the code adjustment information indicates that the update operation type is included, the code that needs to be updated may be replaced with a new code. When the code adjustment information indicates that the insertion operation type is included, a new code may be inserted at the corresponding position. When the code adjustment information indicates that an updated code is included, the updated code may be used as the second target code. The first page and the second page are generated according to the code of the target program, and when the code changes, content displayed on the page changes accordingly; therefore, the first page and the second page may be updated.

In some embodiments, the updating the first page and the second page according to the second target code includes: (1) loading the second target code in a shared running space; (2) controlling a first process to execute the second target code in the shared running space to update the first page; and (3) controlling a second process to execute the second target code in the shared running space to update the second page.

Specifically, the process is an execution entity of the program. The shared running space is a running space shared by the first page and the second page, such as a shared internal memory space. The first process is a process for generating the first page, and the second process is a process for generating the second page. For example, when the developer tool needs to generate the first page, the first process may be created. When a second page needs to be generated, the second process may be created. By loading the second target code in the running space shared by the first process and the second process, the first process may read the second target code from the shared running space and update the first page according to the second target code. The second process may read the second target code from the shared running space and update the second page according to the second target code, thus realizing the synchronous update of the code of the target program.

In some embodiments, the shared running space is used for loading the runtime environment. The runtime environment is used for representing environment data of the program at runtime, for example, it may include at least one of runtime environment data corresponding to global attributes related to the application or runtime environment data corresponding to local attributes related to the application. The runtime environment describes software or instructions that are executed when the program is running, especially those instructions that are not explicitly written but are essential to the normal operation of the program. For example, the runtime environment may be an environment and a library on which the child application depends when it runs. The runtime environment may include information needed for managing a memory and storing and guiding the running process. A storage area may be obtained from an operating system and used for loading the runtime environment for the operation of the target code. During running, an execution engine may be used as a code interpreter for the target code. After the target code is updated, the execution engine executes the updated code. Execution engines corresponding to the first process and the second process are different.

In some embodiments, the generating the second page corresponding to the second test account according to the first target code includes: acquiring a first running space of the first process, the first running space being used for loading the runtime environment corresponding to the first process; creating a second process, and using the first running space as a shared running space for loading the runtime environment corresponding to the second process, and generating a second page corresponding to the second test account by using the second process according to the first target code.

Specifically, the first page may be created in advance, so the first process has been assigned to load the runtime environment corresponding to the first process. Therefore, when the second process is created, the first running space is also assigned to the second process, for loading the runtime environment corresponding to the second process, that is, the first running space is used as the shared running space of the first process and the second process, thus realizing the sharing of the runtime environment of the first process and the second process, and realizing sharing of the code of the target program. For example, when a code is edited through the test program page corresponding to the first page, such as the first child application debugging window, if content displayed on the first page is changed thereby, the same change will occur in the content displayed on the second page.

In the following, the method provided by this embodiment is used to test an applet. By using the test program being a developer tool as an example, and with reference to the schematic principal diagram of the program testing method according to some embodiments of this disclosure shown in FIG. 9, the method provided by this embodiment is illustrated, including the following steps.

In Step 1, a program start request is received by a developer tool and the developer tool is started.

Specifically, when an operation of the user double-clicking/tapping an icon of the developer tool is received, the developer tool is started.

In Step 2, a user logs in according to a first test account and a password.

Specifically, after the developer tool is started, the developer tool may display a login interface, receive an operation of the user on a login interface, and acquire a user account and a password to log in to a server. The user account is used as a primary account (being the first test account).

In Step 3, a target code is acquired, and a first page is generated according to the target code.

Specifically, the target code may be imported into the developer tool by the user, or may be entered in a code editing area of the developer tool. The code may be a game code, and the first page generated is a game launch page. The first page is embedded in a first debugging window of the development tool.

In Step 4, a test account adding instruction that identifies a second test account is received.

Specifically, the developer tool may display a control that triggers the account adding page. The user may start a multi-account test by clicking/tapping the control on the main window such as the first debugging window. For example, when a click/tap operation on the control is received, a test account adding page may pop up, and at least one candidate virtual user account is displayed on the account adding page. The user may select one or more virtual accounts as the account for the multi-account test, that is, the second test account, and click/tap a "Confirm" control on the interface to trigger the test account adding instruction.

In Step 5, a first target code corresponding to the target program is acquired in response to receiving the test account adding instruction.

In Step 6, a second page corresponding to the second test account is generated according to the first target code.

Figure 9:
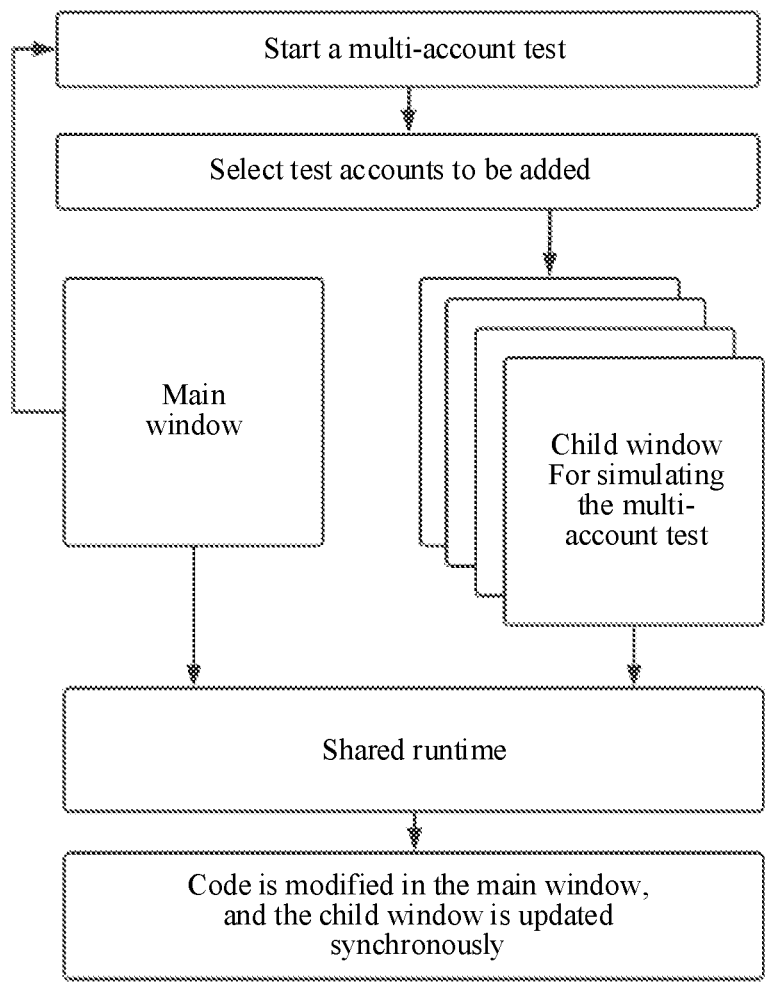
FIG. 9 is a schematic principal diagram of a program testing method according to some embodiments.

Specifically, a second process may be created to create a second page. As shown in FIG. 9, the second process shares a runtime environment with a first process for creating a first page. That is, the main window, such as the first debugging window corresponding to the first test account, shares a runtime with a sub-window, such as a second debugging window corresponding to the second test account. The second page is embedded in the second window of the developer tool. That is, when the second page is generated, the developer tool may also generate the second debugging window. The difference between the main window and the sub-window includes: the code of the target program can be modified in the main window but cannot be modified in the sub-window, and the target code corresponding to the sub-window changes with the target code corresponding to the main window.

In Step 7, a user interacts through the first page and the second page to test the target program.

Specifically, the user may perform game operations on the first page and the second page respectively. The first page and the second page perform an interaction, for example, a game battle, through the first test account and the second test account.

In Step 8, a code debugging instruction is received, the target code is debugged according to the code debugging instruction, and a result of the debugging is obtained.

Specifically, when an error is found in the program during the interaction, the method corresponding to the error may be debugged. For example, if a developer finds that the error may be caused by a function A, he/she may enter an identification of the function A in a debugging panel of the developer tool to debug the function A.

In Step 9, an adjustment instruction for adjusting the first target code is received, the adjustment instruction including code adjustment information, and the adjusted second target code is acquired according to the code adjustment information.

Specifically, when the debugging shows that there is a problem with the function A, the developer may modify the code in the first debugging window to obtain the modified second target code.

In Step 10, the first page and the second page are updated according to the second target code.

Specifically, the first process and the second process share the runtime environment, and therefore, after the code is modified, the main window and the sub-window are updated synchronously, that is, the first page and the second page may be updated according to the second target code.

The program testing method provided in the embodiments of this disclosure may be applied to test applets to find program problems. Of course, it may also be used to test other programs. As a product and technical form, applets may run on mobile clients. A corresponding system of a mobile client may be iOS or Android. Applet developers may use IDEs to develop and debug applets. Developer tools may be logged in by using instant messaging accounts of the developers. Generally speaking, when the instant messaging account is changed, its login status will be synchronized to all open debugging windows; as a result, a test task that requires interaction of a plurality of WeChat accounts cannot be completed on the same terminal, and the user needs to publish the applet in order to perform the multi-account assisted test, which results in low test efficiency, and it is unable to discover the problems of the applet during the interaction.

The method provided by the embodiments of this disclosure provides the functions of multi-account testing and debugging, where the account may also be referred to as an account number. Test accounts may be added on the basis of the main account, and a debugging window corresponding to each test account may be generated. In the debugging window corresponding to each test account, a page generated according to the code of the applet may be embedded, just the login account is different. Therefore, the scenario of multi-account testing is simulated, and the user may test whether there is any problem with the interactive function of the same program through interaction. It is understandable that a test account may be set to log in from one terminal. If the test account is logged in to the present terminal, the login status of another terminal will be invalid to ensure that the first page and the second page interact in the same terminal.

The function of the debugging window corresponding to the added test account may be different from the function of the debugging window corresponding to the main account. For example, the debugging window corresponding to the added test account has an emulator and a debugger, but has no editor. When the code needs to be edited, modification needs to be performed in the debugging window corresponding to the main account. Each debugging window may share the runtime, so when the code of the debugging window corresponding to the main account is updated, a code in another corresponding debugging window is updated synchronously, and executed after compilation to generate the updated first page and second page, thus improving the efficiency of applet development and debugging.

Figure 10:
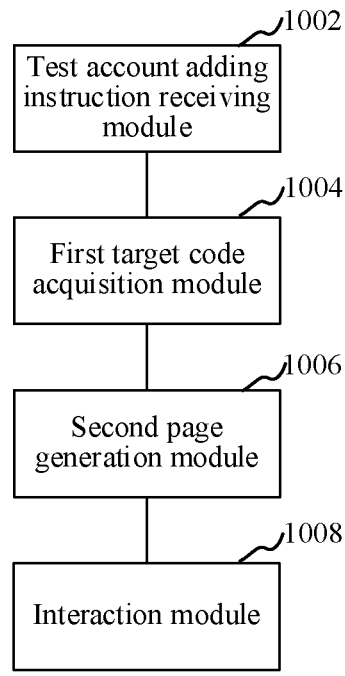
FIG. 10 is a structural block diagram of a program testing apparatus according to some embodiments.

As shown in FIG. 10, according to some embodiments, a program testing apparatus is provided, which may be integrated in the above first terminal 110, and may specifically include a test account adding instruction receiving module 1002, a first target code acquisition module 1004, a second page generation module 1006, and an interaction module 1008. One or more modules of the apparatus can be implemented by processing circuitry, software, or a combination thereof, for example.

The test account adding instruction receiving module 1002 is configured to receive a test account adding instruction that identifies a second test account.

The first target code acquisition module 1004 is configured to acquire a first target code corresponding to a target program in response to the test account adding instruction, the first target code corresponding to a first page, a first test account being logged in on the first page, and the first page being generated according to the first target code.

The second page generation module 1006 is configured to generate a second page corresponding to the second test account according to the first target code.

The interaction module 1008 is configured to interact through the first page and the second page to test the target program.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, the program testing apparatus further includes: (1) a code selection operation receiving module configured to receive a code selection operation in a test program, and use a code selected by the code selection operation as the target code, the first test account being logged in the test program; and (2) a first page generation module configured to generate the first page corresponding to the first test account according to the target code.

In some embodiments, the program testing apparatus further includes: (1) an adjustment instruction receiving module configured to receive an adjustment instruction for adjusting the first target code, the adjustment instruction including code adjustment information; and (2) an update module configured to obtain an adjusted second target code according to the code adjustment information, and update the first page and the second page according to the second target code.

In some embodiments, the update module is configured to: (1) load the second target code in a shared running space; (2) control a first process to execute second target code in the shared running space to update the first page; and (3) control a second process to execute the second target code in the shared running space to update the second page.

In some embodiments, the second page generation module 1006 is configured to: (1) acquire a first running space of the first process, the first running space being used for loading a runtime environment corresponding to the first process; and (2) create the second process, using the first running space as the shared running space for loading the runtime environment, and generate the second page corresponding to the second test account by using the second process according to the first target code.

In some embodiments, the program testing apparatus further includes: (1) a first target code displaying module configured to display the first target code on a test program page corresponding to the first test account; and (2) an adjustment operation receiving module configured to receive an adjustment operation on the first target code, obtain the second target code according to the adjustment operation, and trigger the adjustment instruction for adjusting the first target code.

In some embodiments, the program testing apparatus further includes: (1) a code debugging instruction receiving module configured to receive a code debugging instruction, the code debugging instruction being received through a first code debugging page or a second code debugging page, the first code debugging page being a code debugging page on which the first test account is logged in, and the second code debugging page being a code debugging page on which the second test account is logged in; and (2) a debugging module configured to debug the target code according to the code debugging instruction to obtain a result of the debugging.

In some embodiments, the interaction module is configured to perform at least one of the following steps: receiving an inputted first operation through the first page, and displaying, on the second page, a result of the operation obtained according to the first operation; and receiving an inputted second operation through the second page, and displaying, on the first page, a result of the operation obtained according to the second operation.

In some embodiments, the program testing apparatus further includes: (1) an account adding page displaying module configured to display an account adding page, at least one candidate account being displayed on the account adding page; and (2) a test account adding instruction trigger module configured to use, according to an account selection operation received through the account adding page, a candidate account indicated and selected by the account selection operation as the second test account, and trigger the test account adding instruction.

In some embodiments, the account adding page displaying module is configured to acquire at least one preset virtual account, and generate the account adding page by using the at least one preset virtual account as the at least one candidate account.

In some embodiments, the account adding page displaying module is configured to: (1) display an account adding page, a corresponding account login code being displayed on the account adding page, so that a second terminal scans the account login code and transmits a login authorization instruction to a corresponding server, the login authorization instruction identifying a user account corresponding to the second terminal; and (2) receive the user account corresponding to the second terminal sent by the server according to the login authorization instruction, and display the user account as a candidate account on the account adding page.

Figure 11:
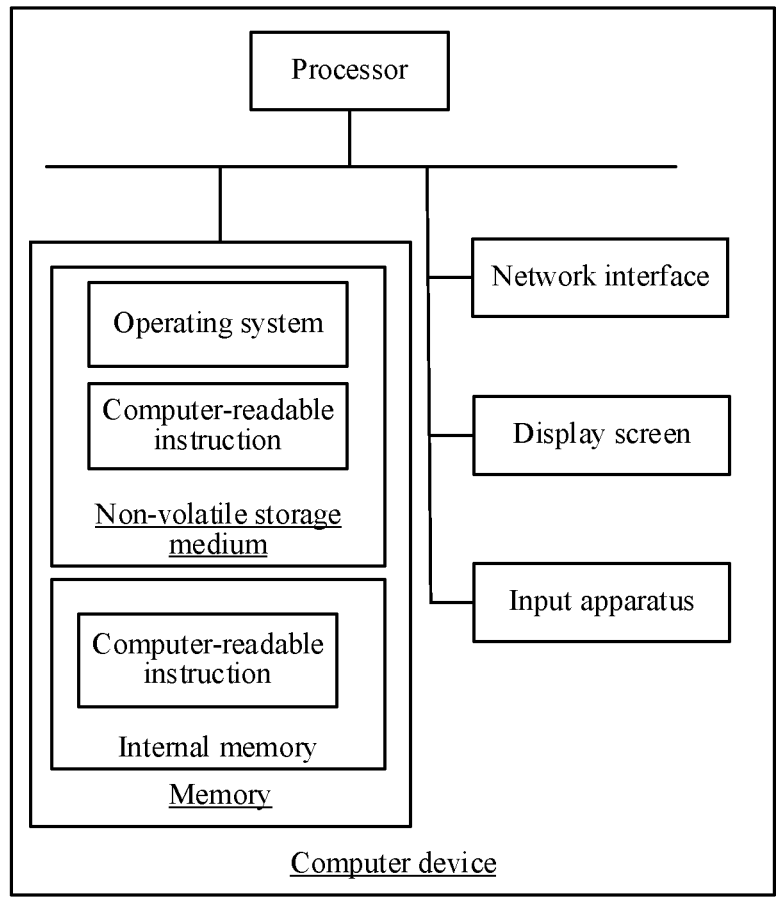
FIG. 11 is a block diagram of an internal structure of a computer device according to some embodiments.

FIG. 11 shows an internal structure diagram of a computer device according to some embodiments. The computer device may be specifically the first terminal 110 in FIG. 1. As shown in FIG. 11, the computer device includes a processor (processing circuitry), a memory, a network interface, an input apparatus, and a display that are connected through a system bus. The memory includes a non-volatile storage medium and an internal memory. The non-volatile storage medium of the computer device stores an operating system, and may also store computer-readable instructions. The computer-readable instructions, when executed by the processor (processing circuitry), may cause the processor (processing circuitry) to implement the program testing method. The internal memory may also store computer readable instructions, and the computer readable instructions, when executed by the processor (processing circuitry), may cause the processor (processing circuitry) to perform the program testing method. The display screen of the computer device may be a liquid crystal display screen or an electronic ink display screen. The input apparatus of the computer device may be a touch layer covered on the display screen, or a button, a trackball, or a touchpad arranged on a housing of the computer device, or an externally connected keyboard, touchpad, or mouse.

Those skilled in the art may understand that the structure shown in FIG. 11 is a block diagram of part of the structure related to the solution of this disclosure, and does not constitute a limitation on the computer device to which the solution of this disclosure is applied. The specific computer device may include more or fewer parts than shown in the drawing, or combining some parts, or having a different arrangement of parts.

In some embodiments, the program testing apparatus provided in this disclosure may be implemented in a form of computer readable instructions, and the computer readable instructions may run on the computer device as shown in FIG. 11. The memory of the computer device may store program modules that make up the program testing apparatus, for example, the test account adding instruction receiving module 1002, the first target code acquisition module 1004, the second page generation module 1006, and the interaction module 1008 shown in FIG. 10. The computer-readable instructions formed by the program modules cause the processor to perform the operations in the program testing method according to the embodiments of this disclosure described herein.

For example, the computer device shown in FIG. 11 may receive a test account adding instruction identifying the second test account through the test account adding instruction receiving module 1002 in the program testing apparatus shown in FIG. 10; the first target code acquisition module is configured to acquire a first target code corresponding to a target program in response to the test account adding instruction, the first target code corresponding to a first page, a first test account being logged in on the first page, and the first page being generated according to the first target code; the second page generation module 1006 is configured to generate a second page corresponding to the second test account according to the first target code; and the interaction module 1008 is configured to interact through the first page and the second page to test the target program.

In some embodiments, a computer device including a memory and processing circuitry is provided, the memory stores computer-readable instructions, and the computer-readable instructions, when executed by the processing circuitry, cause the processing circuitry to perform the operations of the above program testing method. Here, the operations of the program testing method may be the operations in the program testing method of each of the above embodiments.

In some embodiments, a non-transitory computer-readable storage medium storing computer-readable instructions is provided, and the computer-readable instructions, when executed by processing circuitry, cause the processing circuitry to execute the operations of the above program testing method. Here, the operations of the program testing method may be the operations in the program testing method of each of the above embodiments.

In one embodiment, a computer program product or computer program is provided. The computer program product or computer program includes computer instructions, and the computer instructions are stored in a computer-readable storage medium. The processing circuitry of the computer device reads the computer instructions from the computer-readable storage medium, and the processor executes the computer instructions, so that the computer device executes the operations in the above method embodiments.

It is to be understood that although the steps in the flowcharts of the embodiments of this disclosure are displayed in sequence according to arrows, the steps are not necessarily performed in the sequence indicated by the arrows. Unless there is a clear description in this article, there is no strict order for the execution of these steps, and these steps may be executed in other orders. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

A person of ordinary skill in the art may understand that all or part of the processes in the above embodiment methods may be implemented by instructing relevant hardware through computer-readable instructions. The computer-readable instructions may be stored in a non-volatile computer readable storage medium, and the computer-readable instructions, when executed, may include the processes of the above method embodiments. Any reference to memory, storage, database, or other media used in the embodiments provided in this disclosure may include a non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration rather than a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this disclosure.

The foregoing embodiments show several implementations of this disclosure, and descriptions thereof are in detail, but cannot be understood as a limitation to the patent scope of this disclosure. It is pointed out that for those of ordinary skill in the art, several modifications and improvements may be made without departing from the concept of this disclosure, and these modifications and improvements all fall within the protection scope of this disclosure. Therefore, the protection scope of this disclosure is subject to the protection scope of the appended claims.

The invention claimed is:

1. A method for program testing, performed by a computer device, the method comprising:
 receiving a test account adding instruction that identifies a second test account;
 acquiring a first target code corresponding to a target program in response to receiving the test account adding instruction, the first target code corresponding to a first page, a first test account being logged in on the first page, and the first page being generated according to the first target code;
generating a second page corresponding to the second test account according to the acquired first target code corresponding to the target program, wherein the first page and the second page are generated according to the first target code; and
interacting through the first page and the second page to test the target program.

2. The method according to claim 1, wherein before the receiving, the method further comprises:
receiving a code selection operation in a test program, and using a code selected by the code selection operation as the first target code, the first test account being logged in the test program; and
generating the first page corresponding to the first test account according to the first target code.

3. The method according to claim 1, wherein the method further comprises:
receiving an adjustment instruction for adjusting the first target code, the adjustment instruction comprising code adjustment information; and
obtaining a second target code according to the code adjustment information, and updating the first page and the second page according to the second target code.

4. The method according to claim 3, wherein the updating the first page and the second page according to the second target code further comprises:
loading the second target code in a shared running space;
executing, by a first process, the second target code in the shared running space to update the first page; and
executing, by a second process, the second target code in the shared running space to update the second page.

5. The method according to claim 4, wherein the generating the second page further comprises:
acquiring a first running space of the first process, the first running space being for loading a runtime environment corresponding to the first process; and
creating the second process, using the first running space as the shared running space for loading the runtime environment, and generating the second page corresponding to the second test account by using the second process according to the first target code.

6. The method according to claim 3, wherein the method further comprises:
displaying the first target code on a test program page corresponding to the first test account; and
receiving an adjustment operation on the first target code, obtaining the second target code according to the adjustment operation, and triggering the adjustment instruction for adjusting the first target code.

7. The method according to claim 1, wherein the method further comprises:
receiving a code debugging instruction, the code debugging instruction being received through a first code debugging page or a second code debugging page, the first code debugging page being a code debugging page on which the first test account is logged in, and the second code debugging page being a code debugging page on which the second test account is logged in; and
debugging the first target code according to the code debugging instruction to obtain a result of the debugging.

8. The method according to claim 1, wherein the interacting comprises at least one of: receiving an inputted first operation through the first page, and displaying, on the second page, a result obtained according to the first operation; and receiving an inputted second operation through the second page, and displaying, on the first page, a result obtained according to the second operation.

9. The method according to claim 1, wherein the method further comprises:
displaying an account adding page, at least one candidate account being displayed on the account adding page; and
using, according to an account selection operation received through the displayed account adding page, a candidate account selected by the account selection operation as the second test account, and triggering the test account adding instruction.

10. The method according to claim 9, wherein the displaying the account adding page further comprises:
acquiring at least one preset virtual account, and generating the account adding page by sing the at least one preset virtual account as the at least one candidate account.

11. The method according to claim 9, wherein the displaying the account adding page further comprises:
displaying the account adding page, a corresponding account login code being displayed on the account adding page, so that a second terminal scans the account login code and transmits a login authorization instruction to a corresponding server, the login authorization instruction identifying a user account corresponding to the second terminal; and
receiving the user account corresponding to the second terminal sent by the server according to the login authorization instruction, and displaying the user account as the candidate account on the account adding page.

12. An apparatus for program testing, the apparatus comprising:
processing circuitry configured to:
receive a test account adding instruction, the test account adding instruction identifying a second test account;
acquire a first target code corresponding to a target program in response to receiving the test account adding instruction, the first target code corresponding to a first page, a first test account being logged in on the first page, and the first page being generated according to the first target code;
generate a second page corresponding to the second test account according to the acquired first target code corresponding to the target program, wherein the first page and the second page are generated according to the first target code; and
interact through the first page and the second page to test the target program.

13. The apparatus according to claim 12, wherein the processing circuitry is further configured to:
receive a code selection operation in a test program, and use a code selected by the code selection operation as the first target code, the first test account being logged in the test program; and
generate the first page corresponding to the first test account according to the first target code.

14. The apparatus of claim 12, wherein the processing circuitry is further configured to:
receive an adjustment instruction for adjusting the first target code, the adjustment instruction comprising code adjustment information; and obtain a second target code according to the code adjustment information, and updating the first page and the second page according to the second target code.

15. The apparatus of claim 14, wherein, in updating the first page and the second page according to the second target code, the processing circuitry is further configured to:
load the second target code in a shared running space;
execute, by a first process, the second target code in the shared running space to update the first page; and
execute, by a second process, the second target code in the shared running space to update the second page.

16. The apparatus of claim 15, wherein, in generating the second page, the processing circuitry is further configured to:
acquire a first running space of the first process, the first running space being for loading a runtime environment corresponding to the first process; and
create the second process, using the first running space as the shared running space for loading the runtime environment, and generate the second page corresponding to the second test account by using the second process according to the first target code.

17. The apparatus of claim 14, wherein the processing circuitry is further configured to:
display the first target code on a test program page corresponding to the first test account; and
receive an adjustment operation on the first target code, obtain the second target code according to the adjustment operation, and trigger the adjustment instruction for adjusting the first target code.

18. The apparatus of claim 12, wherein the processing circuitry is further configured to:
receive a code debugging instruction, the code debugging instruction being received through a first code debugging page or a second code debugging page, the first code debugging page being a code debugging page on which the first test account is logged in, and the second code debugging page being a code debugging page on which the second test account is logged in; and
debug the first target code according to the code debugging instruction to obtain a result of the debugging.

19. A computer device, comprising a memory and processing circuitry, the memory storing computer-readable instructions, and the computer-readable instructions, when executed by the processing circuitry, cause the processing circuitry to perform the method according to claim 1.

20. A non-transitory computer-readable storage medium storing computer-readable instructions, the computer-readable instructions, when executed by processing circuitry, causing the processing circuitry to perform:
receiving a test account adding instruction that identifies a second test account;
acquiring a first target code corresponding to a target program in response to receiving the test account adding instruction, the first target code corresponding to a first page, a first test account being logged in on the first page, and the first page being generated according to the first target code;
generating a second page corresponding to the second test account according to the acquired first target code corresponding to the target program, wherein the first page and the second page are generated according to the first target code; and
interacting through the first page and the second page to test the target program.

\* \* \* \* \*